(12) United States Patent
Bassett et al.

(10) Patent No.: US 7,081,201 B2
(45) Date of Patent: *Jul. 25, 2006

(54) ENCAPSULATED FILTER CARTRIDGE

(75) Inventors: Laurence W. Bassett, Killingworth, CT (US); Martin Blaze, Hamden, CT (US); Thomas Hamlin, Vernon, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 52 days.

This patent is subject to a terminal disclaimer.

(21) Appl. No.: 10/418,386

(22) Filed: Apr. 18, 2003

(65) Prior Publication Data

US 2003/0222010 A1    Dec. 4, 2003

Related U.S. Application Data

(60) Provisional application No. 60/374,067, filed on Apr. 19, 2002.

(51) Int. Cl.
| | |
|---|---|
| B01D 25/00 | (2006.01) |
| B01D 25/02 | (2006.01) |
| B01D 27/14 | (2006.01) |
| B01D 27/06 | (2006.01) |
| B01D 27/04 | (2006.01) |
| B01D 29/07 | (2006.01) |
| B01D 24/00 | (2006.01) |
| B01D 63/02 | (2006.01) |
| B01D 63/14 | (2006.01) |

(52) U.S. Cl. .................. 210/315; 210/493.1; 210/487; 210/489; 210/321.86; 210/338; 210/266; 210/436; 210/458; 210/503; 210/510.1

(58) Field of Classification Search .............. 210/493.1, 210/487, 489, 321.86, 321.77, 315, 338, 210/266, 436, 458, 503, 510.1
See application file for complete search history.

(56) References Cited

U.S. PATENT DOCUMENTS

| | | | |
|---|---|---|---|
| 3,526,001 A | 8/1970 | Smith | 210/23 |
| 4,595,500 A | 6/1986 | Galbiati | 210/266 |
| 4,636,307 A | 1/1987 | Inoue et al. | 210/188 |

(Continued)

FOREIGN PATENT DOCUMENTS

EP    0364111    4/1990

(Continued)

OTHER PUBLICATIONS

PCT International Search Report dated Oct. 29, 2003.

(Continued)

*Primary Examiner*—John Kim
*Assistant Examiner*—Krishnan S. Menon
(74) *Attorney, Agent, or Firm*—R. Thomas Payne

(57) ABSTRACT

An encapsulated filter cartridge is disclosed, which includes a filter assembly including a carbon block filter element and a microporous filter element. The filter cartridge has a permanently sealed sump defining an interior chamber configured to accommodate the filter assembly, the sump having an inlet for permitting unfiltered fluid to enter the interior chamber for communicating with the radially outer surface of the filter assembly and an outlet for permitting filtered fluid to exit the interior chamber from the axial portion of the filter assembly. The microporous filter element of the filter assembly may include a hollow fiber subassembly housed within the axial cavity of the carbon block element, said fiber subassembly including a plurality of hollow microporous fibers, or a pleated filter element surrounding the radially outer surface of the carbon block element.

20 Claims, 10 Drawing Sheets

U.S. PATENT DOCUMENTS

| | | | |
|---|---|---|---|
| 4,714,546 A | 12/1987 | Solomon et al. | 210/137 |
| 4,828,698 A | 5/1989 | Jewell et al. | 210/266 |
| 5,092,990 A | 3/1992 | Muramatsu et al. | 210/136 |
| 5,102,542 A | 4/1992 | Lawrence et al. | 210/264 |
| 5,151,180 A | 9/1992 | Giordano et al. | 210/264 |
| 5,258,127 A * | 11/1993 | Gsell et al. | 210/767 |
| 5,290,457 A * | 3/1994 | Karbachsch et al. | 210/792 |
| 5,707,518 A | 1/1998 | Coates et al. | 210/316 |
| 5,882,517 A | 3/1999 | Chen et al. | 210/496 |
| 5,928,588 A | 7/1999 | Chen et al. | 264/113 |
| 6,113,784 A | 9/2000 | Stoyell et al. | 210/493.2 |
| 6,136,189 A | 10/2000 | Smith et al. | 210/266 |
| 6,139,739 A | 10/2000 | Hamlin et al. | |
| 6,290,848 B1 | 9/2001 | Tanner et al. | 210/266 |

FOREIGN PATENT DOCUMENTS

| | | |
|---|---|---|
| JP | 1-135583 | 5/1989 |
| JP | 1990-83086 | 3/1990 |
| JP | 6-91989 | 11/1994 |

OTHER PUBLICATIONS

"Cartridge Filters", Peter Soelkner et al., Sartorius AG, Göttingen, Germany, pp. 145-168.

* cited by examiner

ENCAPSULATED FILTER CARTRIDGE

RELATED APPLICATION

The subject application claims the benefit of priority of the Provisional U.S. Patent Application Ser. No. 60/374,067, filed on Apr. 19, 2002, which is hereby incorporated by reference in its entirety.

BACKGROUND OF THE INVENTION

1. Field of the Invention

The subject invention relates to a fluid filtration device, and more particularly, to an encapsulated filter cartridge having a permanently sealed sump, configured to accommodate a filter assembly. The filter assembly includes a carbon block filter element and a microporous filter element. The microporous filter element of the filter assembly may be, for example, a hollow microporous fiber subassembly housed within the axial cavity of the carbon block element or a pleated filter element surrounding the radially outer surface of the carbon block filter element.

2. Background of the Related Art

In most areas of the world, drinking or tap water contains significant amounts of harmful or offensive chemicals, suspended particulate matter, and microorganisms. In a variety of circumstances, these contaminants must be removed before the water can be used. Although municipal water treatment plants attempt to address this problem, many individuals and organizations find such efforts insufficient and utilize on-site water filters. Frequently, such water filters are integrated into appliances, such as ice makers of refrigerators or water dispensers.

Filter elements containing activated carbon are known to be effective in removing chemicals from water, e.g., chlorine, hydrogen sulfide, pesticides, herbicides, phenol, chlorophenol and hydrocarbon. Removal of such contaminants usually improves the taste, odor and appearance of the filtered water. Nonetheless, most carbonaceous filter elements are not fine enough to remove bacteria, viruses or other microorganisms. For that purpose, various microporous filter elements have been incorporated into filtration devices in addition to carbonaceous filter elements. Microporous filter elements known to be effective at removing bacteria, viruses, and other microorganisms include hollow microporous fibers, such as those described in the U.S. Pat. No. 3,526,001 (the disclosure of which is incorporated by reference herein), microporous membranes, such as those described in the U.S. Pat. No. 6,113,784 (the disclosure of which is incorporated by reference herein), and other structures capable of performing a similar function.

Typically, on-site filters are designed to be mounted in a permanent housing coupled to a fluid stream, e.g., in series with a pipe, and include some means of access to the filter cartridge inside the housing for replacing such cartridge when needed. Another way of coupling fluid filters to a fluid stream is by way of countertop filtration units. A countertop filtration unit is a portable apparatus dimensioned to fit on a standard household countertop adjacent to the sink and adapted for coupling to a fluid flow outlet, such as a faucet.

A. Composite Fluid Filtration Devices Including Carbon and Microporous Fibers Several references describe fluid filtration devices utilizing combinations of hollow fiber filter assemblies and carbon block filter elements. For example, U.S. Pat. No. 5,151,180 to Giordano et al. describes a filter device for use in a residential water supply system. The device includes a container having an enclosed cavity and a filter unit disposed in that cavity. The filter unit includes a first radial flow filter subassembly and a second axial flow filter subassembly. According to one embodiment of the U.S. Pat. No. 5,151,180, the radial flow subassembly includes a carbon block cylinder covered in a pre-filter layer and disposed radially outwardly of the axial flow subassembly nested in the center thereof. The axial flow subassembly includes a hollow fiber-type filter unit disposed within a cylindrical plastic shell. Inlet and outlet fittings are connected to the underside of the base of the filter unit. Water to be purified flows from the inlet into the interior chamber in the upward direction, radially inwardly through the carbon block filter, and then through the radial flow assembly in the downward direction, exiting the interior chamber through the outlet at the bottom of the chamber. The filter assembly is removably disposed within a housing.

U.S. Pat. No. 4,636,307 to Inoue et al. describes a hollow-fiber filtering module and a water purification device employing such a hollow-fiber filtering module. According to one embodiment of U.S. Pat. No. 4,636,307, the water purification device includes a container, an absorbent module removably mounted in the container, a hollow-fiber filtering module fitted within the absorbent module, and a nozzle for discharging the treated water. The nozzle is located at the top portion of the container and above the filtering modules. U.S. Pat. No. 4,636,307 notes that the absorbent module may contain granulated activated carbon. Water to be purified is fed into the container through an inlet at the bottom of the device. Once water fills the space between the inner wall of the container and the outer wall of the absorbent module, the water enters the absorbent module through the module's upper surface and flows in the downward direction through its entire length. Then, the fluid enters the hollow-fiber filtering module and travels in the upward direction, so that the purified fluid can be extracted through the nozzle at the top of the container. Due to the use of granulated activated carbon in the absorbent module, this water-purification device suffers from various disadvantages, such as the setting of the carbon particles over time, leading to decreased filtration efficiency, and channeling of the filtrate in the sorbant bed due to unintended shock or vibration, leading to a decrease in the reliability of the filtration system.

U.S. Pat. No. 5,102,542 to Lawrence et al. describes a compound canister-type filter. According to one of the embodiments, the compound filter may comprise a cylindrically shaped carbon filtration system and a hollow fiber bundle. The carbon portion has an axial cavity and the hollow fiber bundle can be inserted into that cavity. The central cavity of the carbon portion also contains a cylindrically shaped flow control tube surrounding the fiber bundle. The tube forces the water to take a longer path through the carbon to provide added filtration for the incoming fluid. Preferably, the flow control tube insulates approximately 70% of the bundle's length form the radial flow. This arrangement, in part due to the use of the flow control tube, requires high fluid pressures for filtration and results in high fluid pressure drop in the filtration process. In addition, while filtration may be improved by increasing the path of the water through the carbon medium, U.S. Pat. No. 5,102,542 fails to take into account that filtration rate efficiency of the porous hollow fibers and filtration life of the assembly are significantly reduced by the reduction of the exposed surface area of the fibers available for radial filtration.

Furthermore, although U.S. Pat. No. 5,102,542 purports to provide an improved procedure for removal of the filter element from its housing, the process remains rather complicated.

Japanese Patent No. 1-135583 describes a water purifying device. The device includes a first cup-shaped filtering portion comprising activated carbon and a second filtering portion, housed mostly within the first portion, comprising porous hollow yarns bent in the shape of a U. According to some embodiments of the invention, water enters the first filtering portion at the bottom of the water purifying device, travels upward and inward through the activated carbon, and exits the first portion through its inner surface. The water then enters the hollow yarns of the second filtering portion and travels in the upward direction toward the outlet at the top of the water purifying device. According to other embodiments of the Japanese Patent No. 1-135583, water to be purified enters the first filtering portion through that portion's upper surface, travels downward through the activated carbon, and accumulates at the bottom of the first portion. Once enough water accumulates at the bottom of the first portion, the water enters the hollow yarns of the second portion and flows upward toward the outlet at the top of the device.

Japanese Patent No. 1-957682 describes a fluid filter having inner and outer housings. According to one embodiment of the invention, activated carbon is located between the inner and outer housings. A bundle of hollow fibers is provided within the inner housing. Water to be purified enters the space between the housings at the bottom of the device and travels in the upward direction through activated carbon. Upon reaching the top of the cavity formed by the inner and outer housings, the fluid pours into the inner housing and travels through the microporous fibers in the downward direction towards the outlet located at the bottom.

Japanese Patent No. 2-83086 describes a water purifier having a primary filtering member for removing chemical impurities, a secondary filtering member for removing microorganisms, and an antibacterial means between the primary filtering member and a secondary filtering member. According to one embodiment of the Japanese Patent No. 2-83086, the primary filtering member is a cylindrical activated carbon filter and the secondary filtering member is a hollow thread unit arranged within the central cavity of the carbon filter. The antibacterial means may be realized by adding an antibacterial agent to the material of which hollow thread units are made, by placing a non-woven cloth containing an antibacterial agent at the water intake of the secondary filter member, or by supplying a disinfectant to water residing between the primary and secondary filter members. The water is first supplied into a casing enclosing the primary and secondary filter units. From the casing, the water flows radially inwardly through the activated carbon filter, passes in the upward direction through the filtration pores of the hollow thread units, and then is taken out of the filter unit through a central passage at the top.

U.S. Pat. No. 5,092,990 to Muramutsu et al. describes a filter device, including a generally cylindrical casing and a filter element contained in the casing. According to one embodiment, the filter element includes a corrugated filter membrane and a support net in contact with the inner surface of the filter membrane. The corrugated membrane can be made of a filter cloth and shaped to have a generally cylindrical contour, with a pre-coat layer of activated carbon particles formed on the outer surface of the membrane. A hollow fiber unit is disposed within the support net. The water to be filtered enters the filter unit through the outer surface of the corrugated filter membrane, passes through the support net and, after travelling in the upward direction through the hollow fibers, exits the filter element through the central opening at the top.

The pre-coat design described in U.S. Pat. No. 5,092,990 has various disadvantages. For example, coating the outer surface of the membrane with a layer of activated carbon inhibits porosity of the membrane, so that the coated membrane becomes incapable of relatively coarse filtration. In addition, the pre-coat design may result in insufficient depth and non-uniform thickness of the carbon layer or, possibly, even in bare spots on the membrane.

B. Composite Fluid Filtration Devices Including Carbon and Microporous Membranes U.S. Pat. No. 4,714,546 to Solomon et al. discloses a portable water filter having a water-impermeable tube within the filter's housing, a tubular pleated element surrounding the tube and an activated carbon filter located within the tube. In operation, some of the water from the inlet flows through the tubular pleated element and then through the carbon filter element to a second outlet. Another portion of the water from the inlet flows along the tubular pleated element to flush the tubular element and then flows out through a first outlet. The water that flows radially through the pleated element then enters the water-impermeable tube at the bottom opening and flows in the upward direction, eventually exiting through the second outlet at the top of the housing.

U.S. Pat. No. 4,828,698 to Jewell et al. discloses a filtering apparatus having a generally cylindrical filter arrangement, which includes a cylindrically shaped porous means, a cylindrically shaped sorbent-containing means and a cylindrically shaped microporous means. The microporous means is disposed downstream of the other two means. The porous means may include a pleated porous nylon membrane, and the sorbent means may contain activated carbon. The filtrate entering through the axially aligned inlet located at the top of the filtering apparatus is channeled toward the radially outer surface of the filter element. The fluid then flows radially inwardly through the different stages of the filter, into the central cavity of the filter element, and out through the axially aligned outlet at the bottom of the filtering apparatus.

U.S. Pat. No. 6,136,189 to Smith et al. discloses a filter assembly for use with a water bottle having a circular cross-section neck or open end, which may include a cylindrically shaped pleated membrane arranged around an inner filtration media containing activated carbon. In operation, when the filter assembly is immersed in water filling a bottle, the water to be filtered enters through the perforations or slots in the filter's side walls, flows radially inwardly through the pleated membrane, through the inner filtration medium, and into the central space of the filter that communicates with the outlet. The pleated membranes for use in the filtering apparatus, described in U.S. Pat. No. 6,136,189, are not capable of retaining particles smaller then about 1 micron. The porosity of the inner, carbon-containing media is between about 10–150 microns. Further, the filter media remain immersed within and in direct contact with the water to be filtered. These structural shortcomings result in decreased efficiency of this filter and in the lack of quality of the resultant product.

U.S. Pat. No. 6,290,848 to Tanner et al. discloses a filter cartridge for a gravity-fed water treatment device, which contains a porous particulate filter, such as a pleated membrane, and granular media, such as carbon, disposed within the porous particulate filter. The granular media is disposed in the central volume of the filter. The water to be treated first flows into the interior volume of the filter, through the granular media, then radially outwardly through the porous particulate filter.

Finally, U.S. Pat. No. 5,707,518 to Coates et al. describes a refrigerator water filter having inlet and outlet port connectors, located at the top of the filter housing, and a replaceable filter cartridge inside the housing. The replaceable filter cartridge includes a cylindrical body having a multi-material construction. The body includes an inner cylinder of compressed or extruded carbon, an intermediate layer of fiber floss, and an outer mesh wrap. A longitudinal bore extends through the filter body and is in fluid communication with the outlet port connector. The water is purified as it flows radially inwardly through the filter body toward the longitudinal bore. The filtered water thereafter flows upwardly through the bore and is extracted from the outlet port connector. The housing of the filter includes a top part and a bottom part that are releasably secured to one another, so that the filter cartridge can be accessed and replaced when needed. The water filter described in U.S. Pat. No. 5,707,518 does not include a microporous element for removing microorganisms and suffers from the need to open the housing in order to replace the filter element.

Although references discussed above disclose composite filter elements incorporated into filtration devices, they do not teach or suggest, alone or in combination, a disposable encapsulated filter cartridge, nor do they provide a filter cartridge assembly suitable for inclusion and effective operation as part of a disposable encapsulated filter cartridge. In addition, some of the water filters described in the above-mentioned references utilize granular activated carbon. As explained above, using such medium in a water filter results in various disadvantages as compared to the present disclosure, which teaches, among other things, the use of a carbon block filter element to reduce chemical contamination and particulate matter within a fluid stream.

Therefore, there remains a need in the field of fluid filtration for an improved filtration device and a cartridge therefor that effectively and efficiently reduce both chemical contamination and microorganisms in a fluid stream, which afford adequate filter life and provide for consistent filtration quality relatively unaffected by the age of the filter or by ordinary handling of the filter unit, and which may be configured for attachment to an appliance. In addition, there remains a need for a filtration device that is easily replaceable and at the same time remains air- or fluid-tight during operation.

SUMMARY OF THE INVENTION

The inventors of the present disclosure have resolved many of the problems associated with the filter assemblies described above, by employing a permanently encapsulated filter cartridge having a composite filter assembly that includes a carbon block filter element to remove particulate matter and absorb chemical contaminants and a microporous filter element, e.g., a hollow microporous fiber subassembly, a pleated filter element, or a different structure capable of performing a similar function, to remove microorganisms and/or particulate matter from the filtrate passing through the filter cartridge. In contrast to the prior art filtration devices, the encapsulated filter cartridge constructed in accordance with the present disclosure is disposable and may be easily disconnected and discarded as a unit. This is particularly important where the interior chamber of the filter cartridge must be maintained free of contamination, such as in medical or pharmaceutical applications.

Among the advantages of the disposable filter cartridge according to the present disclosure are its increased ease of manufacturing and superior performance characteristics, such as capacity for effective removal of chemical contaminants, particulate matter and microorganisms, while maintaining relatively long life time and relatively low pressure drop. In addition, the disposable filter cartridge according to the present disclosure need not be opened in order to replace the filter assembly, but is removed and discarded as a unit. This advantageous feature helps avoid contamination of the appliance and the hands of the person manipulating the filter cartridge by stray carbon and other particles from the filter and promotes air- or fluid-tight operation of the filter cartridge. Furthermore, this feature facilitates contamination-free operation of the filter cartridge itself.

Among the advantages of the filter assembly having a microporous filter element disposed upstream of the carbon block filter element is its capability of retaining microorganisms before they can enter the carbon block element where they can grow, multiply and eventually colonize the filter cartridge. In addition, when the carbon block element is located downstream of the microporous element, any undesirable odor or taste generated in the microporous element, e.g., due to the presence of microorganisms, may be subsequently removed by the carbon block element.

Thus, the subject invention is directed to an encapsulated filter cartridge having a filter assembly that includes a carbon block filter element and a microporous filter element. The encapsulated filter cartridge also has a permanently sealed sump, which defines an interior chamber configured to accommodate the filter assembly. The sump has an inlet for permitting the unfiltered medium to enter the interior chamber for communicating with the radially outer surface of the filter assembly and an outlet for permitting the filtered medium to exit the interior chamber from the axial portion of the filter assembly.

In one embodiment of the encapsulated filter cartridge constructed according to the subject disclosure, the filter assembly includes a carbon block filter element having an axial cavity and a hollow fiber subassembly housed within the axial cavity of the carbon block element, the fiber subassembly including a plurality of hollow microporous fibers. The filter assembly may further include a perforated core tube surrounding the plurality of hollow microporous fibers and a perforated liner tube surrounding the perforated core tube, housed within the axial cavity of the carbon block element and supporting the hollow fiber subassembly within the axial cavity of the carbon block element by an annular flange.

In another embodiment of the encapsulated filter cartridge constructed according to the subject disclosure, the filter assembly includes a carbon block filter element and a pleated filter element surrounding the radially outer surface of the carbon block element. The pleated filter element preferably includes a membrane structure having a gradient porosity construction, which may have discrete zones of different average pore size. The membrane structure may also include a microporous membrane. At least one drainage layer and one or more cushioning layers may be included in the pleated filter element as well.

The encapsulated filter cartridge may also include an upper end cap operatively associated with the upper end of the filter assembly. The upper end cap may have a neck portion and an axial fluid passage extending therethrough for fluid communication between the axial portion of the filter assembly and the outlet of the sump. A sealing ring may be disposed around the neck portion of the upper end cap. The sump of the encapsulated filter cartridge assembly may have a reception collar surrounding the outlet of the sump for sealing engagement of the neck portion of the upper end cap. In an exemplary embodiment of the subject disclosure, wherein a hollow fiber subassembly is housed within the carbon block element, the neck portion of the end cap may include an interior bore for receiving the fiber subassembly. In the appropriate exemplary embodiments of the subject disclosure, the upper end cap may be configured to receive and sealingly enclose the upper end of the filter assembly.

A lower end cap operatively associated with the lower end of the filter assembly may also be included as part of the encapsulated filter cartridge according to the present disclosure. The lower end cap may be adapted for supporting the filter cartridge assembly within the interior chamber of the sump and may include a plurality of fingers for engaging a wall of the interior chamber of the sump. In the appropriate exemplary embodiments of the subject disclosure, the lower end cap may include an axial passage extending therethrough for communication between the axial portion of the filter assembly and the outlet of the sump.

The permanent enclosure of the filter assembly within the sump is preferably accomplished by a closure cap that is spun welded to an end of the sump. Alternatively, the closure cap may be joined to the end of the sump through other means, e.g., spun welding, ultrasonic welding, hot plate welding and overmolding. In the appropriate exemplary embodiments of the subject disclosure, the closure cap may have an axial passage therethrough for communication between the axial portion of the filter assembly and the outlet of the sump.

The sump may also include means for venting air from the interior chamber of the sump and means for draining the filtrate from the interior chamber of the sump. In some embodiments, the sump may include an inlet tube operatively associated with the inlet of the sump and an outlet tube operatively associated with the outlet of the sump, wherein both inlet and outlet tubes are configured as fittings for mating with an appliance.

These and other aspects of the encapsulated filter cartridge assembly of the subject invention and the methods of using the same will become more readily apparent to those having ordinary skill in the art from the following detailed description hereinbelow.

DESCRIPTION OF THE DRAWINGS

So that those having ordinary skill in the art to which the subject invention pertains will more readily understand how to make and use the subject invention, embodiments thereof will be described in detail hereinbelow with reference to the drawings, wherein.

DETAILED DESCRIPTION OF THE INVENTION

Figure 1A:
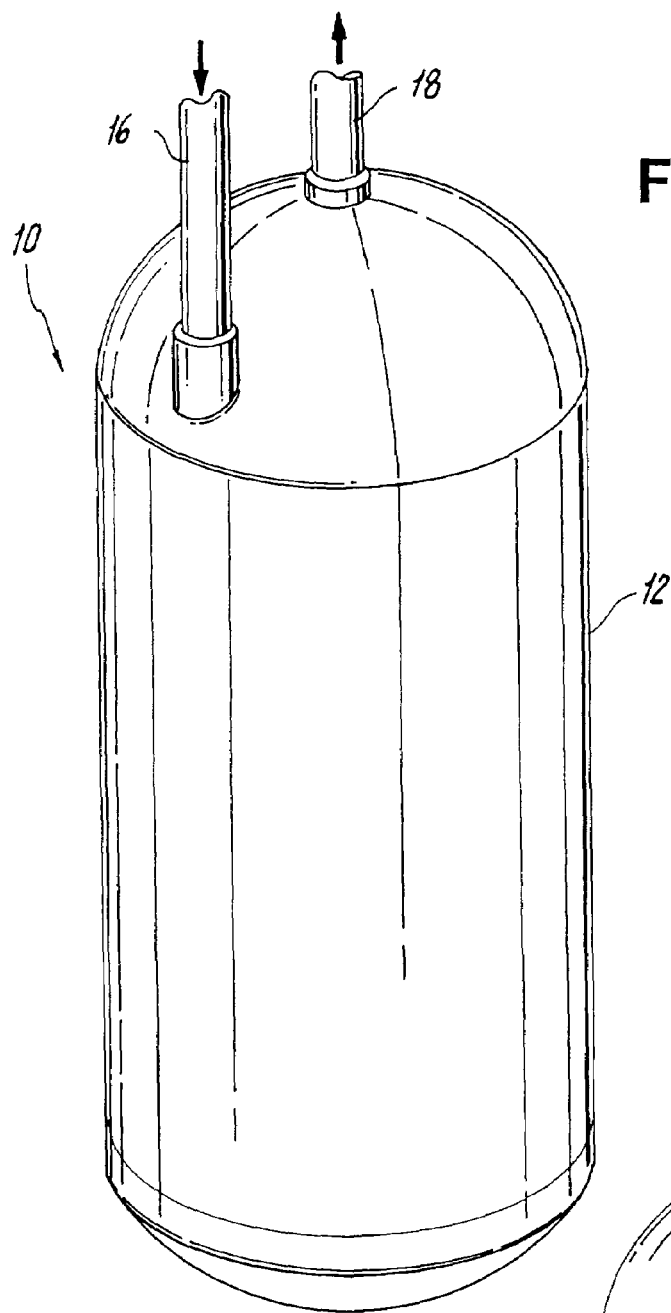
FIG. 1A is a perspective view of an encapsulated filter cartridge constructed in accordance with an exemplary embodiment of the subject disclosure.
Figure 2:
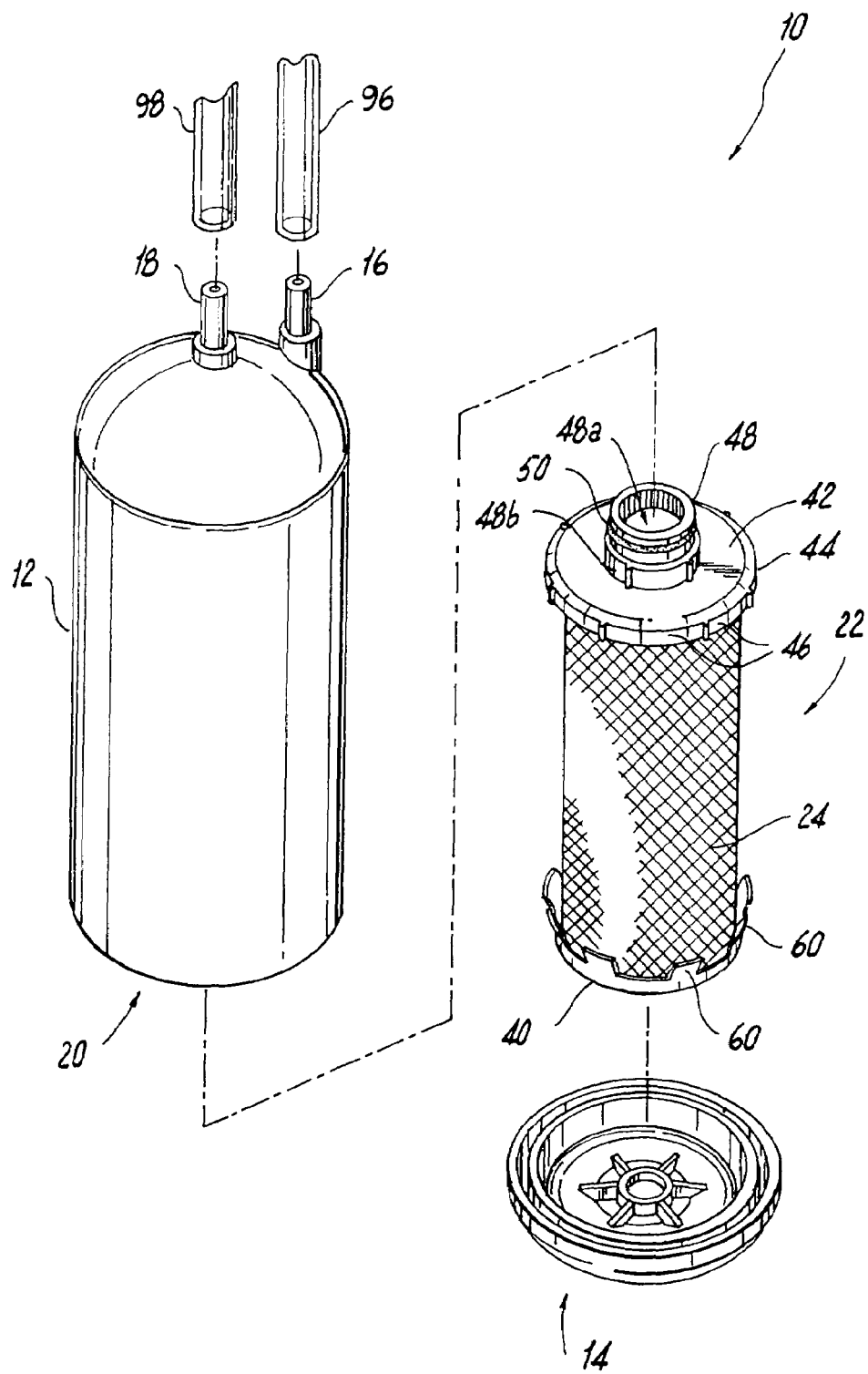
FIG. 2 is an exploded perspective view of an encapsulated filter cartridge constructed in accordance with an exemplary embodiment of the subject disclosure.
Figure 4:
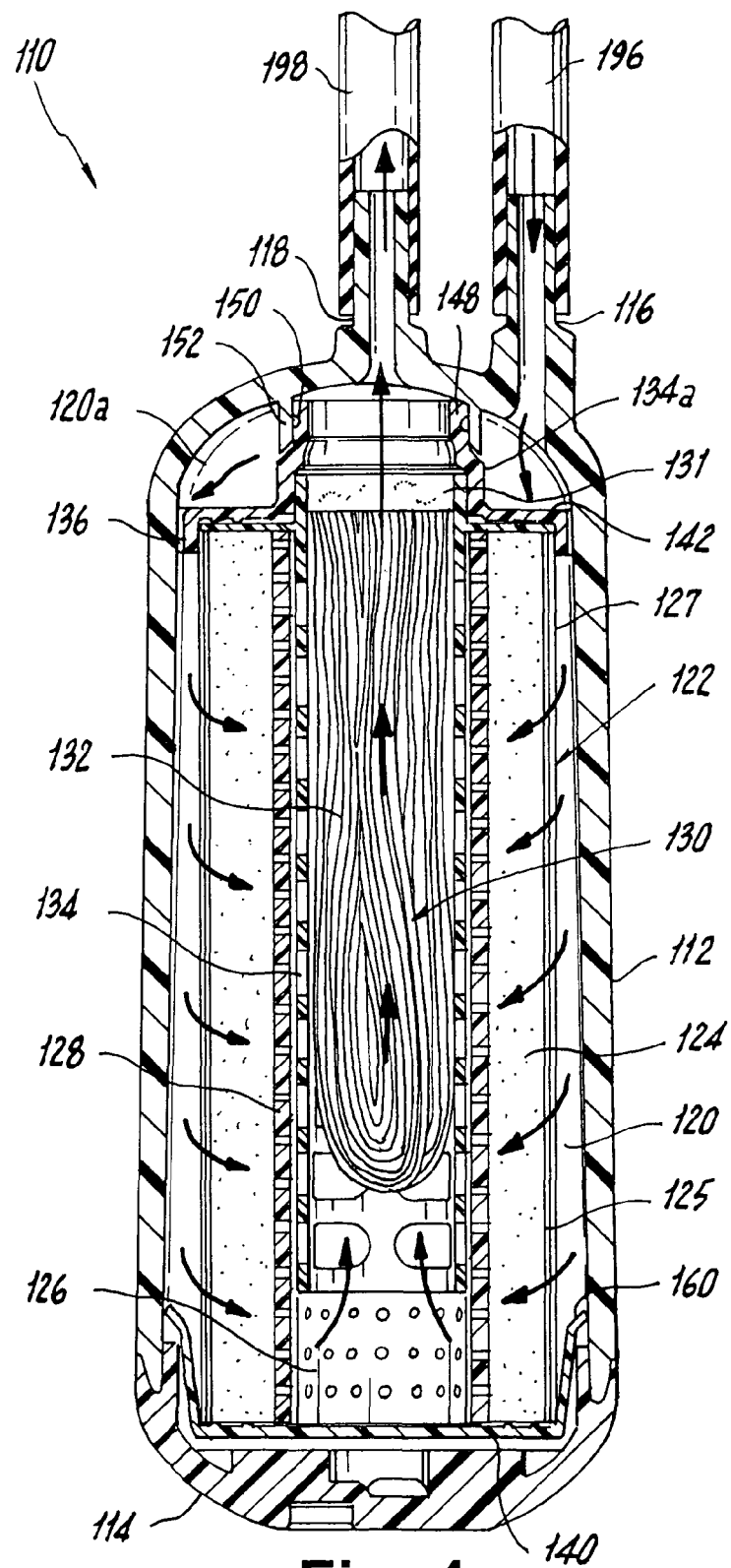
FIG. 4 is a cross-sectional view of an exemplary embodiment of an encapsulated filter cartridge according to the subject disclosure, with a filter assembly as shown in FIG. 3, wherein the direction of fluid flow through the encapsulated filter cartridge is illustrated by arrows.
Figure 7:
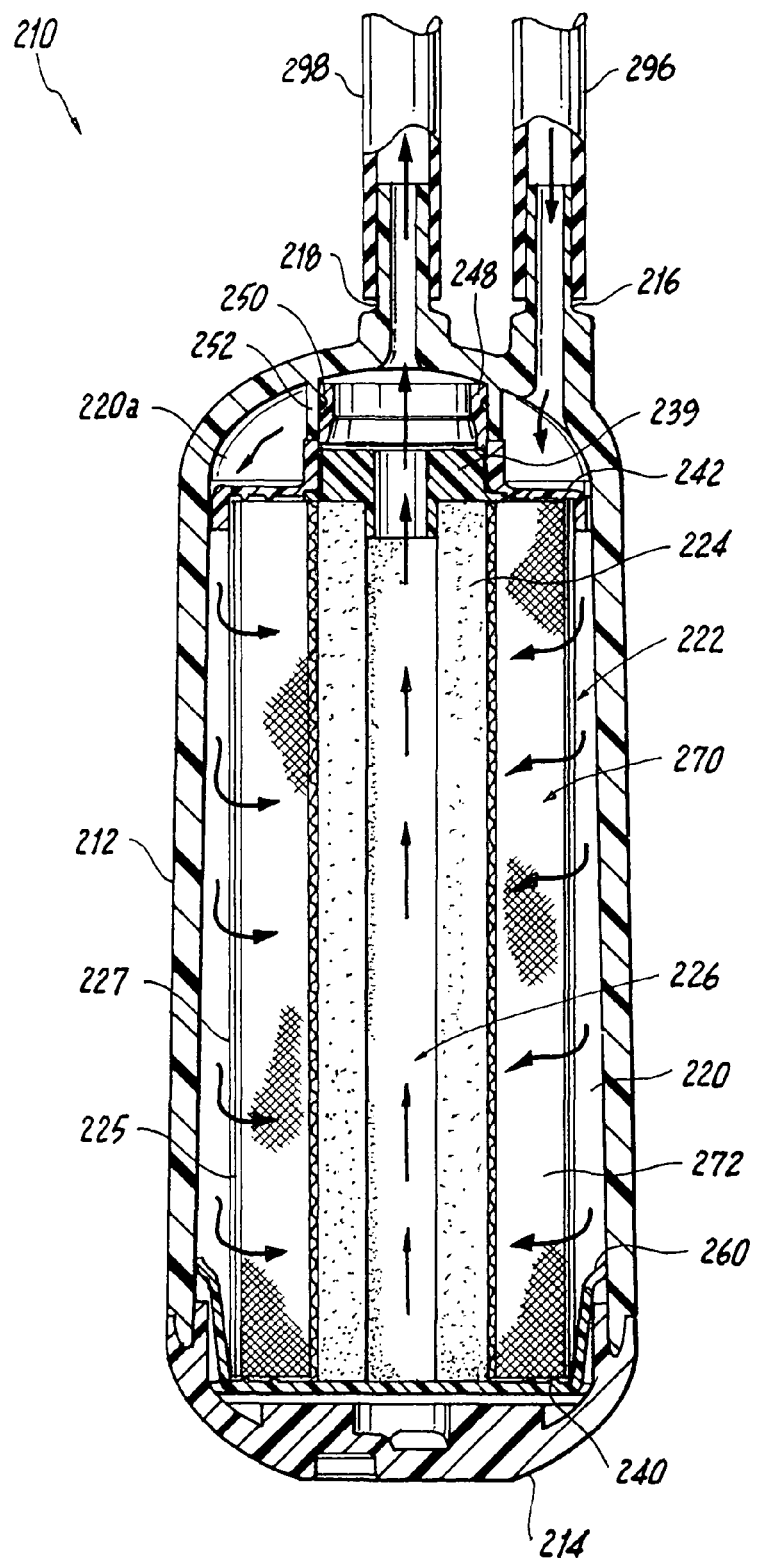
FIG. 7 is a cross-sectional view of an exemplary embodiment of an encapsulated filter cartridge according to the subject disclosure, with a filter assembly as shown in FIG. 5, wherein the direction of fluid flow through the encapsulated filter cartridge is illustrated by arrows.

Referring now to the drawings, wherein like reference numerals identify similar structural elements of the filtration device described herein, there is illustrated in FIG. 1A a disposable encapsulated filter cartridge constructed in accordance with an exemplary embodiment of the subject disclosure and designated generally by reference numeral 10. As illustrated in FIGS. 2, 4 and 7, the filter cartridge 10,110,210 includes a sump 12,112,212 having an interior chamber 20,120,220 for supporting a filter assembly 22,122,222 and a closure cap 14,114,214 at the bottom end thereof for permanently enclosing the filter cartridge within the sump. The closure cap 14,114,214 is preferably spun welded to the bottom end of the sump 12,112,212. Other ways in which the closure cap 14,114,214 may be joined to the bottom end of the sump 12,112,212 may include ultrasonic welding, hot plate welding, induction welding, overmolding and mechanical securement means.

Figure 1B:
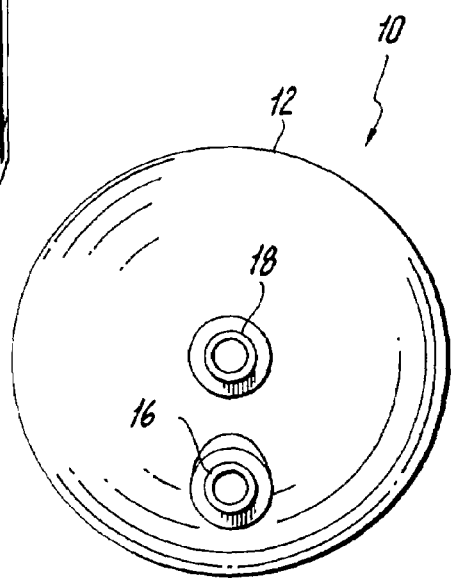
FIG. 1B is a top plan view of the encapsulated filter cartridge of FIG. 1A.

The sump 12,112,212 has an inlet tube 16,116,216 for the ingress of fluid into the interior chamber 20,120,220 of the sump 12,112,212 and an outlet tube 18,118,218 for the egress of fluid from the interior chamber 20,120,220 at the top end of the sump 12,112,212. As illustrated in FIG. 1B, the outlet tube 18 may be generally aligned with the central axis of the sump 12 and the inlet tube 16 may be offset from the central axis of the sump 12. The inlet and outlet tubes 16,116,216 and 18,118,218 are preferably adapted and configured as quick connect/disconnect fittings for mating with corresponding reception ports (96,196,296 and 98,198,298) in an appliance. Preferably, the appliance is a water filtration appliance and, most preferably, it is a water filtration appliance in a refrigerator having an ice maker and/or a fluid dispenser.

Referring to FIGS. 3, 4, 5, and 7, the filter assembly 122,222 includes a cylindrical carbon block filter element 124,224 having an axial cavity 126,226 that may or may not extend therethrough. Such a carbon block filter element may be produced, for example, according to U.S. Pat. Nos. 5,928,588 and 5,882,517 to Wei-Chih Chen et al., both assigned to Cuno Incorporated and incorporated herein by reference. The carbon block element 124,224 preferably has a k-value of between about 0.01 to about 0.10, and demonstrates superior adsorption capacity without any significant reduction in fluid flow rate, or a need for increased pressure to retain a desirable fluid flow rate.

Figure 3:
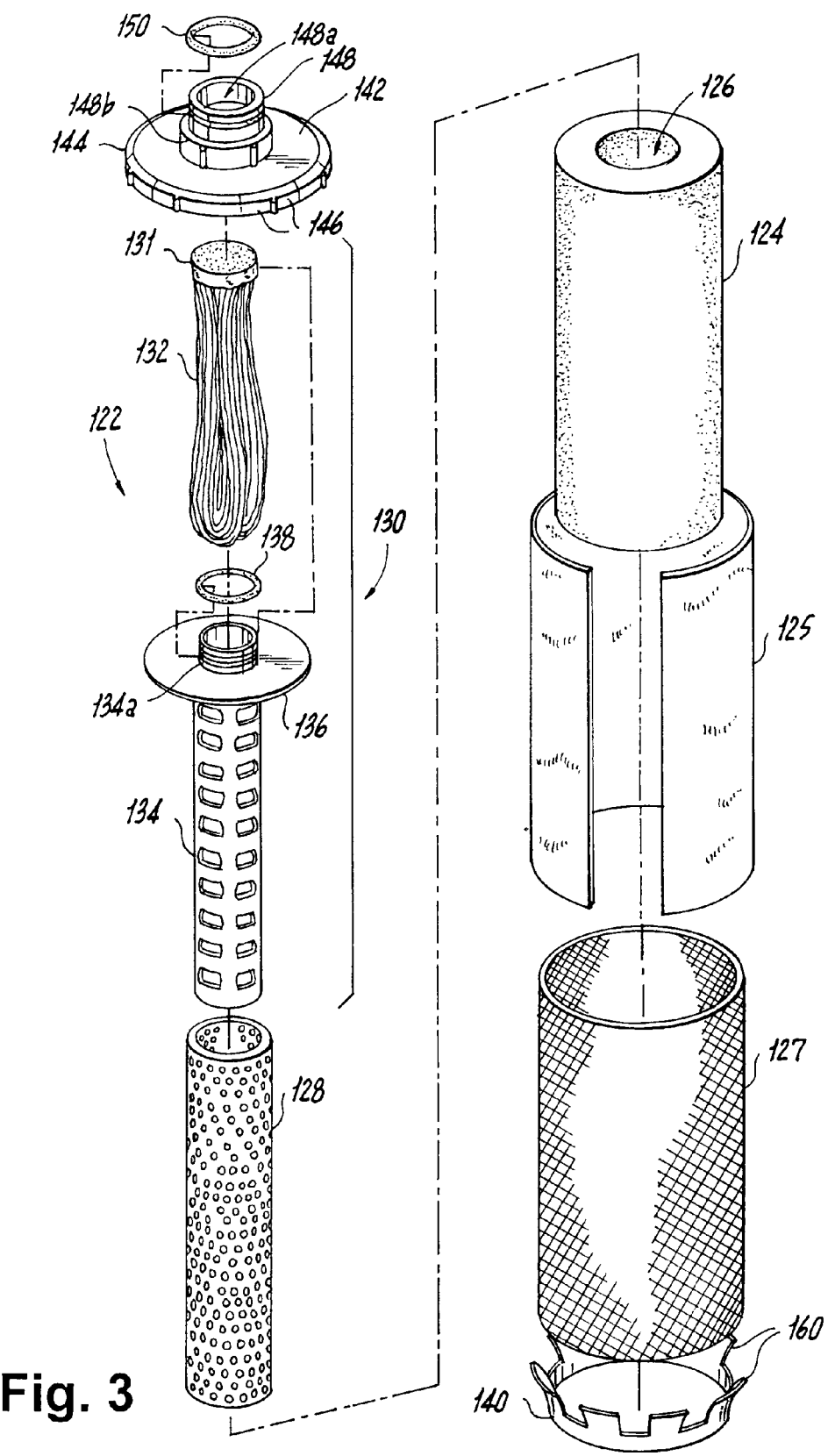
FIG. 3 is an exploded perspective view of an exemplary embodiment of a filter assembly according to the subject disclosure, with parts separated for ease of illustration.

According to one embodiment of the present disclosure, illustrated in FIGS. 3 and 4, the filter assembly 122 may include a prefilter 125, made of any suitable material known to those of ordinary skill in the art, disposed around the outer circumference of the carbon block element 124. Examples of prefilter materials include any suitable sheet-like fleeces of polypropylene, polyester, polyamide, resin-bonded or binder-free fibers (e.g., glass fibers), and other synthetics (woven and non-woven fleece structures); sintered materials such as polyolefins, metals, and ceramics; yarns; special filter papers (e.g., mixtures of fibers, cellulose, polyolefins, and binders); polymer membranes; and others. Preferably, the prefilter 125 is made of a non-woven polypropylene (e.g., melt-blown) or a non-woven polyester. In addition to prefilter 125, the filter assembly 122 may include a protective netting 127 disposed around the prefilter 125 and securing the prefilter 125 around the carbon block element 124. The protective netting 127 can be made of any suitable polymeric material or another material. For high temperature applications, a metallic mesh or screen may be used.

Referring further to FIGS. 3 and 4, the filter assembly 122 includes a microporous filter element, which in this embodiment is a hollow fiber subassembly 130, housed within the axial cavity 126 of the carbon block element 124. As illustrated in FIGS. 3 and 4 and described in greater detail in the commonly assigned U.S. Pat. No. 6,139,739 to Hamlin et al., the disclosure of which is incorporated by reference herein, in appropriate embodiments of the subject disclosure, the hollow fiber subassembly 130 may include a bundle of hollow cylindrical fibers or thin microporous tubes 132, the opposed ends of which are preferably potted in a relatively non-porous material 131 as known to those of ordinary skill in the art. In use, fluid is filtered while passing through the pores in the walls of the thin tubes or fibers 132. The fibers or tubes 132 are preferably made from a hydrophilic polysulfane and are potted at their ends with polyurethane, although nylon microporous tubes may also be used, as disclosed for example in commonly assigned U.S. Pat. No. 5,151,180 to Giordano et al., the disclosure of which is hereby incorporated by reference herein. Other suitable materials known to those of ordinary skill in the art also may be used to make or pot the hollow fibers or tubes 132, depending on the medium to be filtered and other relevant factors.

The hollow fiber subassembly 130 may also include a perforated core tube or cage 134, surrounding the hollow fiber bundle 132. Preferably, the perforated core tube or cage is constructed so that at least about 40% of the fibers' surface area is exposed to the radial flow of the filtrate. More preferably, the fibers' surface area exposed to the radial flow of the filtrate is at least about 50%, and even more preferably, at least about 70%. The axial cavity 126 in the carbon block element 124 may also contain a perforated liner tube 128 for providing additional support to the carbon block element 124. The hollow fiber bundle 132 surrounded by a perforated core tube or cage 134 may be supported within the liner tube 128 by an annular flange 136 formed below the top end of the core tube 134. The perforated liner tube 128 is also preferably constructed so that at least about 40% of the fibers' surface area is exposed to the radial flow of the filtrate. More preferably, the fibers' surface area exposed to the radial flow of the filtrate is at least about 50%, and even more preferably, at least about 70%. In some applications, the perforated core or cage 134 and the perforated liner tube 128 may consist of a material that has heat expansion coefficients comparable with those of the filter media. Preferably, both the core tube 134 and the liner tube 128 have perforations or openings that are sufficiently large so as not to obstruct the flow of fluid and produce no significant pressure drop.

According to exemplary embodiments of the subject invention illustrated in FIGS. 3 and 4, the upper portion 134a of the core tube 134 extends beyond the top end of the carbon block filter element 124, and an annular sealing ring 138 is positioned about the upper portion 134a of the core tube 134 spaced from and above the annular flange 136. The annular sealing ring 138 facilitates sealed engagement of the upper portion 134a of the core tube 134 within an upper end cap 142.

Referring to FIGS. 2, 3 and 4, the upper end cap 42,142 is operatively associated with the top end of the filter assembly 22,122. As illustrated in FIGS. 2, 3 and 4, the upper end cap 42,142 preferably is configured to receive the upper end of the carbon block element 24,124 and, in the appropriate embodiments, the upper end of the fiber subassembly 130. The upper end cap 42,142 may include a depending outer flange 44,144 having a plurality of circumferentially located and spaced apart flow channels 46,146 formed therein, which are best seen in FIGS. 2 and 3. In addition, the upper end cap 42,142 may include a stepped neck portion 48,148 having an interior bore 48a,148a for sealingly receiving the upper portion 34a,134a of the core tube 34,134.

The exterior of the neck portion 48,148 may carry an annular sealing ring 50,150 positioned thereabout and dimensioned and configured for sealed engagement within an annular reception collar 152 (shown in FIG. 4), which may be located generally around the outlet tube, 18,118 and project downwardly from the upper end of the interior chamber 20,120 of the sump 12,112. The sealed engagement of the neck portion 48,148 of the upper end cap 42,142 within the reception collar 152 of the sump 12,112 facilitates communication between the hollow fiber subassembly 130 of the filter assembly 22,122 and the central outlet tube 18,118 of sump 12,112. The exterior of the neck portion 48,148 may further include a stepped portion 48b,148b located below and spaced apart from the sealing ring 50,150 for further facilitation of the engagement of the neck portion 48,148 by the reception collar 152.

With continuing reference to FIGS. 2, 3 and 4, in exemplary embodiments of the subject disclosure, a lower end cap 40,140 is operatively associated with the bottom end of filter assembly 22,122. Preferably, the lower end cap 40, 140 is configured to receive the lower end of the carbon block element 124 and may also be adapted and configured to support the filter assembly 22,122 within the sump 12,112. According to a preferred embodiment of the subject invention, the lower end cap 40,140 includes a plurality of circumferentially disposed outwardly flared fingers 60,160 for engaging the wall of the interior chamber 20,120 of the sump 12,112.

Referring specifically to FIG. 4, which has a set of arrows indicating the direction of the flow of filtrate through the encapsulated filter cartridge 110, in operation, unfiltered medium enters the upper region 120a of the interior chamber 120 of the sump 112 through the inlet tube 116. In exemplary embodiments of the subject invention, the unfiltered medium then propagates through the circumferentially located and spaced apart channels 146 (see FIG. 3) formed in the outer flange 144 of the upper end cap 142, and further into the lower portions of the interior chamber 120 of the sump 112. In the embodiments of the subject invention that include the prefilter 125, the unfiltered medium first passes through the prefilter 125 and then propagates radially inwardly through the carbon block element 124. In the exemplary embodiments, the medium then passes through the perforations of the liner tube 128 and through the perforations of the core tube 134 before entering the hollow fibers 132 of the hollow fiber subassembly 130. In the embodiments that do not include the liner tube 128 or the core tube 134, the medium exiting the carbon block element 124 then enters the hollow fibers 132 of the hollow fibers subassembly 130. After traversing the hollow fiber subassembly 130 in the upward direction, the filtered medium exits the interior chamber of the sump 120 of filter cartridge 110 through the outlet tube 118.

The encapsulated filter cartridge 110 constructed in accordance with the subject disclosure as described above has various advantages over the prior art. Among those advantages are the increased ease of manufacturing and superior performance characteristics due to the permanent encapsulation of the filter assembly 122 within the sump 120 by the closure cap 114. The filter cartridge 110 need not be opened in order to replace the filter assembly 122, but is removed and discarded as a unit. This feature helps avoid contamination of the surrounding areas by stray particles from the filter assembly 122, promotes air- or fluid-tight operation of the filter cartridge 110, and facilitates contamination-free operation at the filter assembly 122.

Figure 5:
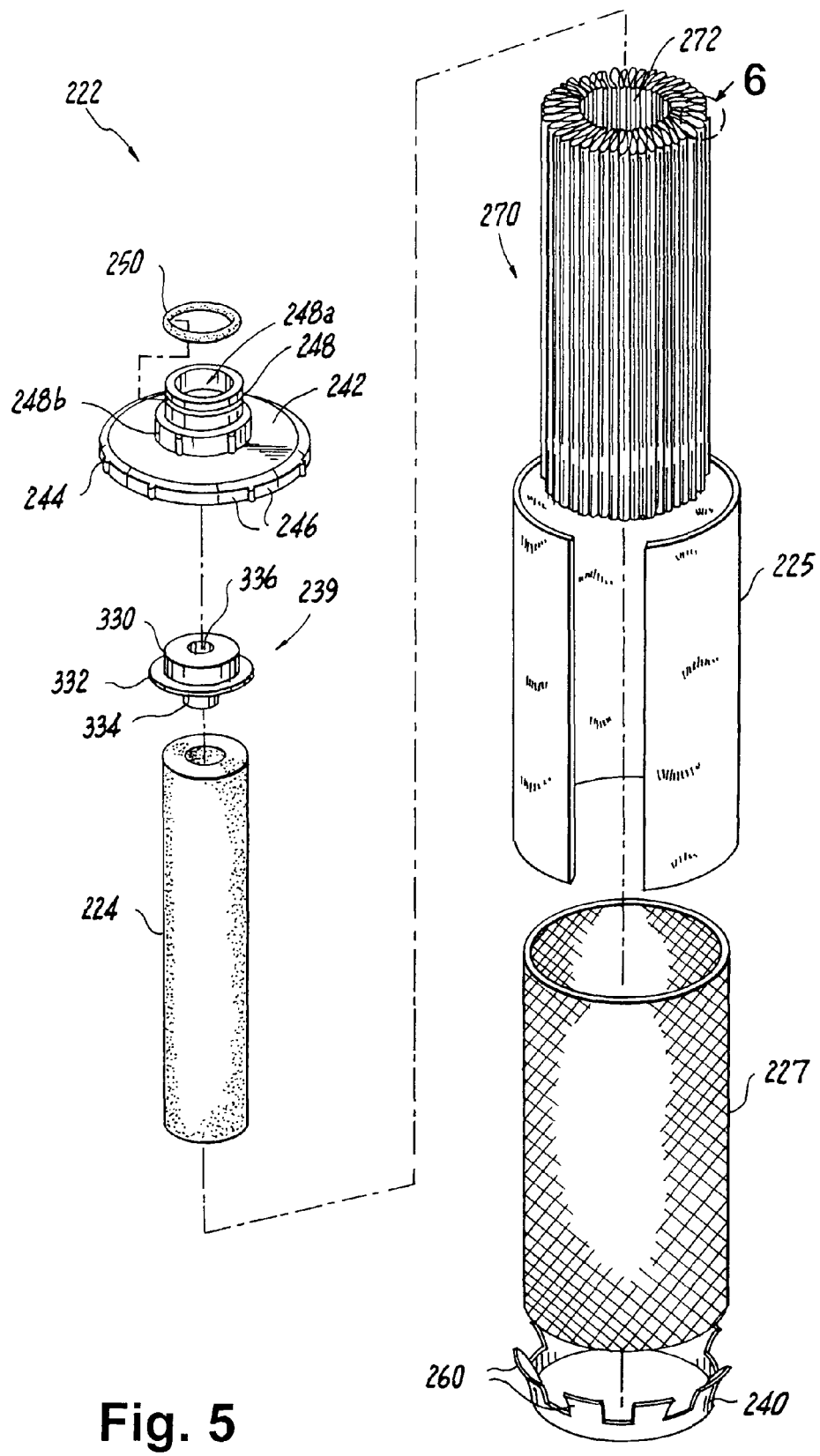
FIG. 5 is an exploded perspective view of another exemplary embodiment of a filter assembly according to the subject disclosure, with parts separated for ease of illustration.

According to another exemplary embodiment of the present disclosure, illustrated in FIGS. 5 and 7, the filter assembly 222 includes a microporous filter element, which in this embodiment is a generally cylindrical pleated filter element 270, disposed around the outer circumference of a carbon block element 224. Filter assemblies 222 suitable for use in the appropriate embodiments of the present disclosure are described in a U.S. patent application entitled "Filter Assembly Utilizing Carbon Block and Pleated Filter Element," Application Publication No. 2004/0206682 A1 of Oct. 21, 2004 filed on even date herewith, the disclosure of which is hereby incorporated by reference herein.

The pleated filter element 270 may include a membrane structure 272. Materials suitable for use as a part of the membrane structure 272 include a variety of polymeric materials having porous voids, such as cellulose acetate (CA), polysulfone (PSU), polyethersulfone (PESU), polyamide (PA), polyvinylidene fluoride (PVDF), polytetrafluoroethylene (PTFE), polycarbonate (PC), polypropylene (PP), and nylon. Average pore sizes of the materials included in the membrane structure 272 generally range between about 0.05 and about 5 microns, depending on the particular requirements of the application. The thickness of the membrane structure 272 generally range between about 130 and about 300 microns, while the thickness of the pleated element 270 may be much larger. It will be also understood by those of ordinary skill in the art that the subject disclosure encompasses the use of spiral-pleated membrane structures, radial pleated membrane structures, straight non-radial pleated membrane structures, membrane structures with pleats oriented orthogonally to the central axis, W-shaped multi-pleat structures (radial or spiral), modified W-shaped pleat structures and any number and/or combinations thereof.

The membrane structure 272 may include a single layer or a plurality of layers of the same or different media disposed atop one another to a desired thickness. The membrane structure 272 may also include a plurality of layers having different filtering characteristics. In a preferred embodiment, the membrane structure 272 has a gradient porosity construction. "Gradient porosity" means, in the context of the subject disclosure, that the average pore size in the membrane structure 272 varies as a function of depth into the membrane. For example, the membrane structure 272 may include discrete zones or layers having different average pore sizes.

Figure 6:
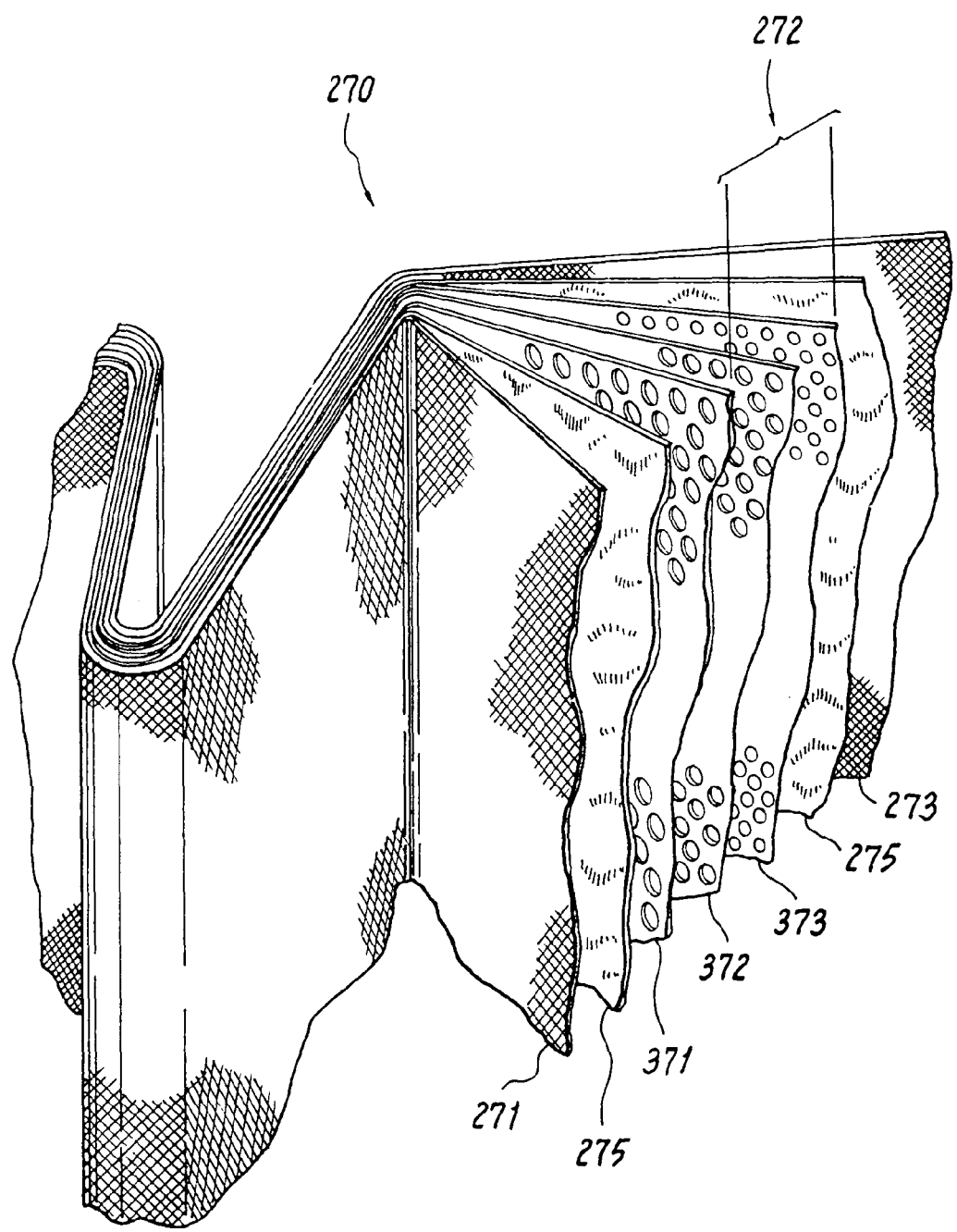
FIG. 6 is an enlarged sectional view of a pleated filter element that may be used in exemplary embodiments of the present disclosure, wherein the constituent layers are fanned out for illustration purposes.

The membrane structure 272 having a gradient porosity construction is illustrated in FIG. 6, which represents a sectional view of the pleated filter element 270 with the constituent layers fanned out for illustration purposes. In this embodiment, the membrane structure 272 includes adjacent layers of media 371, 372 and 373, wherein the downstream layer 373 has a smaller average pore size than layers 371 and 372. The middle layer 372 may have the same or smaller average pore size than the upstream layer 371. In a preferred embodiment of the subject disclosure, the layers of media 371 and 372 have an average pore size rated at about 0.65 micron and the layer of media 373 has an average pore size rated at about 0.2 micron.

As shown in FIG. 6, the pleated filter element 270 may also include a drainage layer 271 upstream of the membrane element 272, a drainage layer 273 downstream of the membrane element 272, or both. One or both of the layers 271 and 273 may also have the additional functionality of supporting the membrane structure 272 and may be of the same or different construction and composition. On the other hand, some new polymeric materials, such as PSU, PESU, PVDF, and PTFE, can be pleated as a single- or multiple-layer membrane structure 272 without reinforcement. Preferably, layers 271 and 273 are distinct layers that are separate from the membrane structure 272 and can be in the form of a mesh, a screen, or a relatively coarsely porous woven or non-woven sheet. More preferably, the upstream layer 271 includes flexible sheeting of spun bounded polypropylene fibers and the downstream layer 273 includes plastic netting. Other suitable materials and structures known to those of ordinary skill in the art may also be used to manufacture the membrane structure 272 and the support layers 271 and 273, depending on the medium to be filtered, the temperature of the filtrate, and other relevant factors.

The pleated filter element 270 may further include components other than the membrane structure 272 and the drainage layers 271, 273. For example, a cushioning layer 275 (or layers) may be placed between the membrane structure 272 and one or both of the drainage layers 271, 273. Such a cushioning layer or layers 275 may be included in the pleated filter element 270 in order to prevent abrasion of the membrane structure 272 due to its surface contact with the drainage layers 271 and 273, when the filter media expand and contract in response to pressure and/or temperature fluctuations of the fluid in the system in which the filter is installed. The cushioning layer or layers 275 are preferably made of a material smoother than the drainage layers 271,273 and having a higher resistance to abrasion than the media of the membrane structure 272.

The filter assembly 222 according to the disclosed exemplary embodiment may also include a prefilter 225, made of any suitable material known to those of ordinary skill in the art, surrounding the outer circumference of the pleated filter element 270. The prefilter 225 may be made of any material suitable for making the prefilter 125, described with reference to FIGS. 3 and 4, or structures offering comparable or equivalent functionality. Preferably, the prefilter 225 is made of a non-woven polypropylene (e.g., melt-blown) or a non-woven polyester. In addition to the prefilter 225, the filter assembly 222 may include a protective netting 227 disposed around the prefilter 225 and securing the prefilter 225 about the pleated filter element 270. The protective netting 227 can be made of any suitable polymeric material or another material. For high temperature applications, a metallic mesh or screen may be used.

Referring to FIGS. 2, 5 and 7, an upper end cap 42,242 may be operatively associated with the upper end of the filter assembly 22,222. As illustrated in FIGS. 2, 5 and 7, the upper end cap 42,242 preferably is configured to receive the upper end of the carbon block element 224 and the upper end of the pleated filter element 270. The upper end cap 42,242 may include a depending outer flange 44,244 having a plurality of circumferentially located and spaced apart fluid flow channels 46,246 formed therein. In addition, the upper end cap may include a stepped neck portion 48,248.

The exterior of the neck portion 48,248 may carry an annular sealing ring 50,250 positioned thereabout and dimensioned and configured for sealed engagement within an annular reception collar 252 (shown in FIG. 7), which may be located generally around the outlet tube 18,218 and project downwardly from the upper end of the interior chamber 20,220 of the sump 12,212. The sealed engagement of the neck portion 48,248 of the upper end cap 42,242 within the reception collar 252 of the sump 12,212 facilitates fluid communication between the axial cavity 20,220 in the carbon block element 24,224 and the central outlet tube 18,218 of the sump 12,212. The exterior of the neck portion 48,248 may further include a stepped portion 48b,248b located below and spaced apart from the sealing ring 50,250 for facilitation of sealing engagement of the neck portion 48,248 by the reception collar 252. In the embodiment of the present disclosure shown in FIGS. 5 and 7, the filter assembly 222 may also include an adapter 239 having an axial bore 336 therethrough and operatively associated with the upper end of the carbon block element 224 and with the upper end cap 242 to further facilitate fluid communication between the axial cavity 226 in the carbon block element 224 and the outlet tube 218 of the sump 212. Preferably, the adapter 239 has a first cylindrical portion 334, configured to fit within the axial cavity 226 of the carbon block element 224, a flange 332, and a second cylindrical portion 330 configured to fit within the upper end cap 242.

Figure 7A:
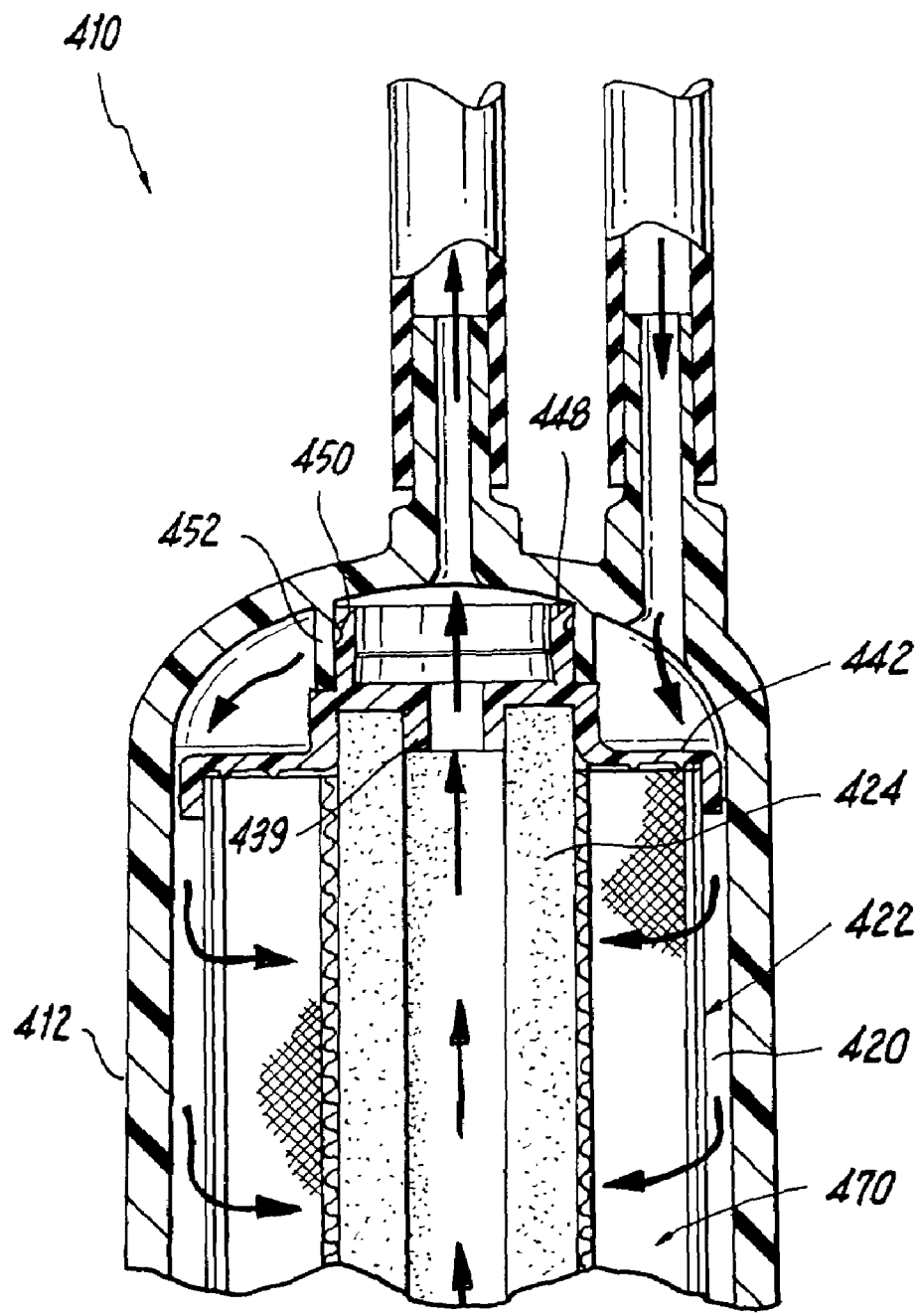
FIG. 7A is a relevant portion of a cross-sectional view of an exemplary embodiment of an encapsulated filter cartridge according to the subject disclosure, illustrating an alternative structure of an upper end cap.

An alternative to the adapter 239 is illustrated in FIG. 7A, which shows a relevant portion of a cross-section of an encapsulated filter cartridge 410 constructed in accordance with the present disclosure. The encapsulated filter cartridge 410 has a sump 412 that includes a reception collar 452 and is configured to accommodate a filter assembly 422 within the interior chamber 420 of the sump 412. The filter assembly 422 includes a carbon block filter element 424 and a pleated filter element 470. The filter assembly 422 further includes an upper end cap 442 operatively associated with the upper end of the filter assembly 422 and having a neck portion 448 and an adapter portion 439. In the exemplary embodiment illustrated in FIG. 7A, the adapter portion 439 is an integral part of the upper end cap 442.

With continuing reference to FIGS. 2, 5 and 7, in the appropriate embodiments of the subject disclosure, a lower end cap 40,240 is operatively associated with the bottom end of the filter assembly 222. Preferably, in this embodiment of the present disclosure, the lower end cap 40, 240 is configured to receive the lower end of the carbon block element 224 and the lower end of the pleated element 270 and may also be adapted and configured to support the filter assembly 222 within the sump 212. According to a preferred embodiment of the subject disclosure, the lower end cap 40,240 includes a plurality of circumferentially disposed outwardly flared fingers 60,260 for engaging the wall of the interior chamber 20,220 of the sump 12,212.

Referring specifically to FIG. 7, which has a set of arrows indicating the direction of the filtrate flow through the encapsulated filter cartridge 210, in operation, unfiltered medium enters the upper region 220a of the interior chamber 220 of the sump 212 through the inlet tube 216. In the appropriate embodiments of the subject disclosure, the unfiltered medium then propagates through the circumferentially located and spaced apart flow channels 246 (see FIG. 5) formed in the outer flange 244 of the upper end cap 242, and further into the lower portions of the interior chamber 220 of the sump 212. In the embodiments of the subject disclosure that include the prefilter 225, the unfiltered medium propagates first through the prefilter before entering the pleated filter element 270. Upon passing through the constituent components of the pleated filter element 270, the fluid propagates radially inwardly through the carbon block element 224 and into the axial cavity 226. After travelling through the axial cavity 226 of the carbon block element 224 in the upward direction, and, in the appropriate embodiments, through the axial bore 336 of the adapter 239 or through the adapter portion 439 of the end cap 442 (see FIG. 7A), the filtered medium exits the interior of the filter cartridge 210 through the outlet tube 218.

The encapsulated filter cartridge 210 constructed in accordance with the subject disclosure as described above also has various advantages over the prior art. Among those advantages are the increased ease of manufacturing and superior performance characteristics due to the permanent encapsulation of the filter assembly 222 within the sump 212 by the closure cap 214. The filter cartridge 210 need not be opened in order to replace the filter assembly 222, but is removed and discarded as a unit. This feature helps avoid contamination of the surrounding areas by stray particles from the filter assembly 222, promotes air- or water-tight operation of the filter cartridge 210, and facilitates contamination-free operation of the filter assembly 222.

Among the advantages of the filter assembly 222 having a pleated element 270 disposed upstream of the carbon block filter 224 element is its capability of retaining microorganisms before they can enter the carbon block element 224 where they can potentially grow, multiply and eventually colonize the filter cartridge. In addition, because in this embodiment the carbon block element 224 is located downstream of the pleated element 270, any undesirable odor or taste generated in the pleated element 270, e.g., due to the presence of microorganisms, may be subsequently removed by the carbon block element 224.

Figure 8:
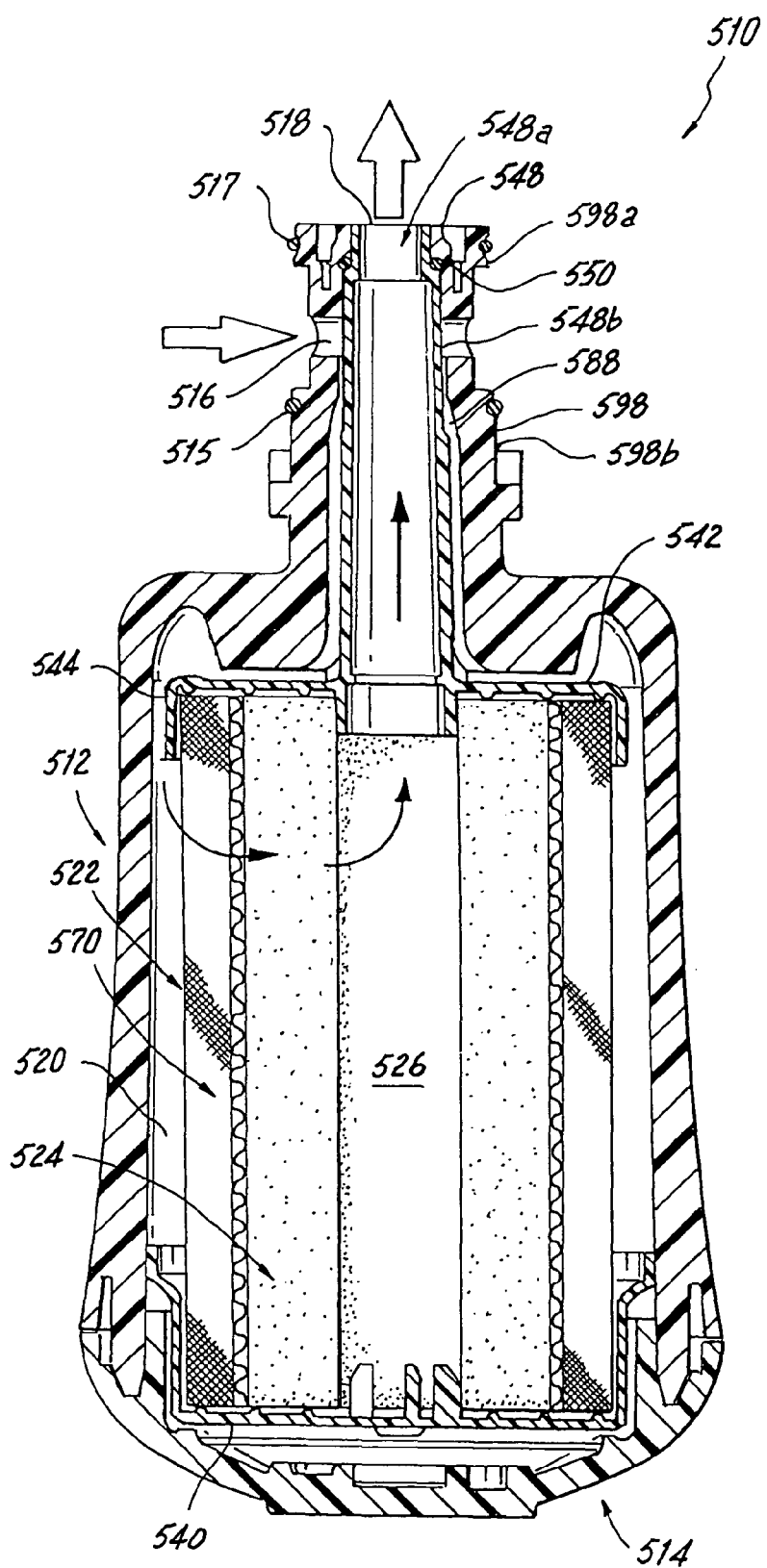
FIG. 8 is a cross-sectional view of another exemplary embodiment of an encapsulated filter cartridge according to the subject disclosure, with a filter assembly including a carbon block filter element and a pleated filter element, wherein the direction of fluid flow through the encapsulated filter cartridge is illustrated by arrows.

FIG. 8 shows a disposable encapsulated filter cartridge constructed in accordance with an alternative embodiment of the subject disclosure and designated generally by reference numeral 510. As illustrated in FIG. 8, the filter cartridge 510 includes a sump 512 having an interior chamber 520 configured for supporting a filter assembly 522 and a closure cap 514 at the bottom end thereof for permanently enclosing the filter assembly 522 within the interior chamber 520 of the sump 512. The closure cap 514 is preferably spun welded to the bottom end of the sump 512. Other ways in which the closure cap 514 may be joined to the bottom end of the sump 512 may include ultrasonic welding, hot plate welding, induction welding, overmolding and mechanical securement means.

With continuing reference to FIG. 8, the sump 512 includes an elongated top portion 598 having a passage 588 extending therethrough and having an inlet 516 for the ingress of filtrate into the interior chamber 520 of the sump 512 and an outlet 518 for the egress of filtrate from the interior chamber 520 at the top end of the sump 512. The inlet 516 may be an opening in the radially outer surface of the elongated top portion 598, as illustrated in FIG. 8, that communicates with the passage 588. The passage 588 may include separate fluid flow channels in order to facilitate communication between the inlet 516 and the interior chamber 520 of the sump 512.

The outlet 518 is located at the top of the elongated top portion 598 and is generally aligned with the central axis of the sump 512. The inlet 516 and outlet 518 are preferably adapted and configured for mating with an appropriate port or module of an appliance, such as a water filtration appliance. Alternatively, the inlet 516 and outlet 518 may be adapted and configured for mating with an adapter, which, in turn, may be configured for mating with an appliance.

The elongated top portion 598 of the sump 512 may have stepped portions 598a and 598b and may also bear a sealing ring 517 disposed around the stepped portion 598a located above the inlet 516 and a sealing ring 515 disposed around the stepped portion 598b located below the inlet 516 to facilitate sealing engagement of the elongated top portion 598 with the appropriate portions of the appliance for which it is configured, or with the appropriate portions at an adapter, as will be understood by those of ordinary skill in the art.

Similar to exemplary embodiments of the subject disclosure shown in FIGS. 5 and 7, the filter assembly 522 of the encapsulated filter cartridge 510 includes a microporous filter element, which in this embodiment is a generally cylindrical pleated filter element 570, disposed around the outer circumference of a carbon block element 524. Both the carbon block filter element 524 and the pleated filter element 570 of this exemplary embodiment are substantially as described in detail above in reference to other embodiments of the subject disclosure. In addition, the filter assembly 522 may include any number and/or combination of elements described above in reference to other exemplary embodiments.

With continuing reference to FIG. 8, an upper end cap 542 is operatively associated with the upper end of the filter assembly 522. Preferably, the upper end cap 542 is configured to receive the upper end of the carbon block element 524 and the upper end of the pleated filter element 570. The upper end cap 542 may include a depending outer flange 544 having a plurality of circumferentially located and spaced apart fluid flow channels (see elements 46, 146 and 246 shown in FIGS. 2, 3 and 5) formed therein. In addition, the upper end cap 542 may include a stepped neck portion 548 having a stepped portion 548b and an axial passage 548a extending therethrough. The stepped neck portion 548 is configured to be accommodated within the passage 588 of the elongated top portion 598 of the sump 512 and to allow the unfiltered medium entering the inlet 516 to pass into the lower regions of the interior chamber 520 of the sump 512 for communication with the radially outer surface of the filter assembly 552. The exterior of the neck portion 548 may carry an annular sealing ring 550 positioned thereabout above the stepped portion 548b and dimensioned and configured for sealed engagement within the passage 588 of in the elongated top portion 598 of the sump 512.

In the appropriate embodiments of the subject disclosure, a lower end cap 540 is operatively associated with the lower end of the filter assembly 522. Preferably, in this embodiment of the present disclosure, the lower end cap 540 is configured to receive the lower end of the carbon block element 524 and the lower end of the pleated element 570 and may also be adapted and configured to support the filter assembly 522 within the sump 512. Preferably, the lower end cap 540 has a structure similar to the lower and caps of exemplary embodiments shown in FIGS. 2, 3 and 5 and described in detail above.

Referring further to FIG. 8, which has a set of arrows indicating the direction of the filtrate flow through the encapsulated filter cartridge 510, in operation, unfiltered medium enters through the inlet 516 in the elongated top portion 598 of the sump 512 into the region between the interior surface of the passage 588 and the outer surface of the stepped neck portion 548. In the appropriate embodiments of the subject disclosure, the unfiltered medium then propagates through the circumferentially located and spaced apart flow channels formed in the outer flange 544 of the upper end cap 542, and further into the lower portions of the interior chamber 520 of the sump 512.

The unfiltered medium then enters the radially outer surface of the filter assembly 522 and propagates radially inwardly into the axial cavity 526 of the carbon block filter element 524. After travelling along the axial cavity 526 of the carbon block element 524 in the upward direction, and, in the appropriate embodiments, through the axial passage 548a of the end cap 542, the filtered medium exits the interior of the filter cartridge 510 through the outlet 518.

Figure 9:
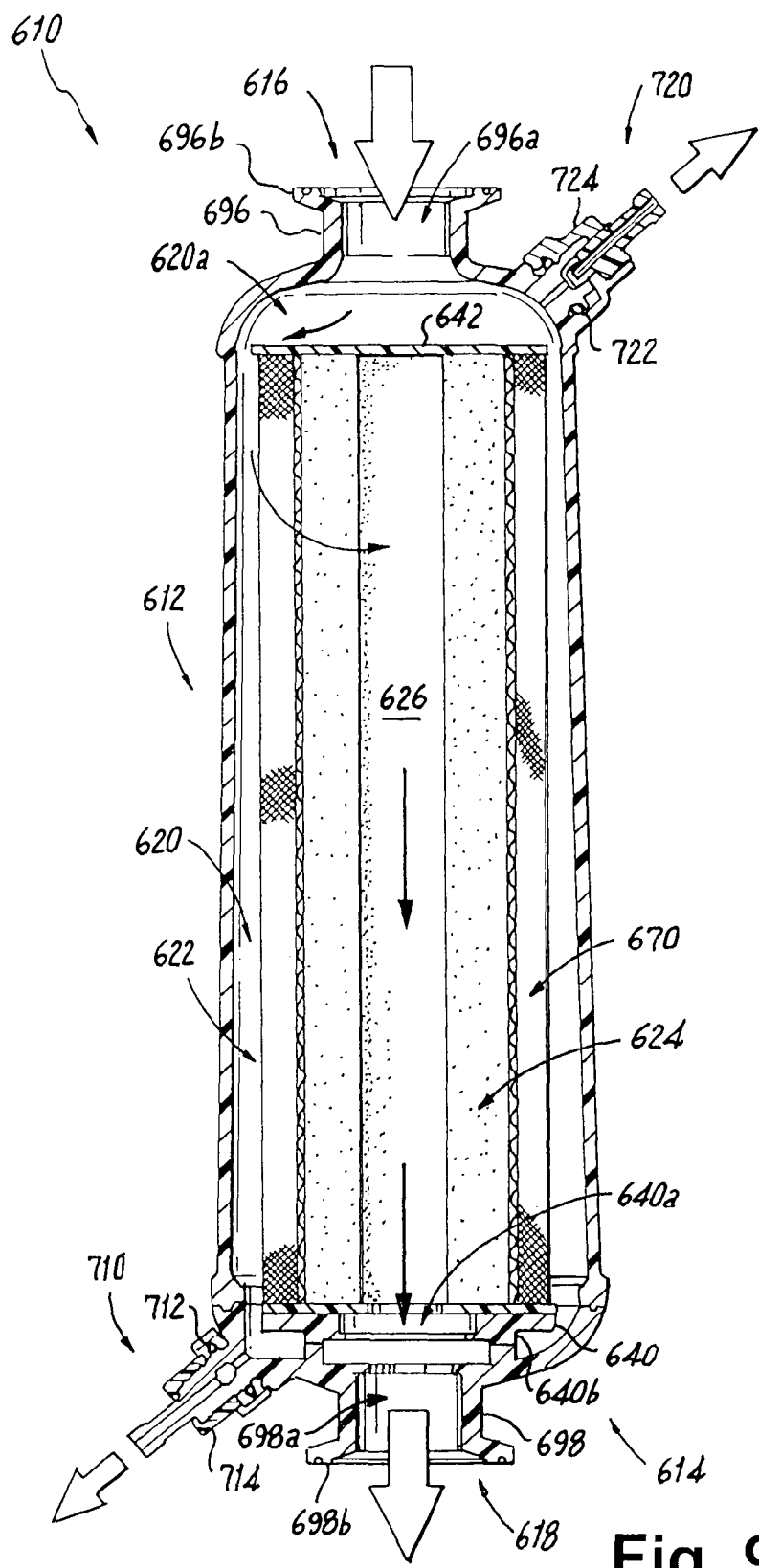
FIG. 9 is a cross-sectional view of yet another exemplary embodiment of an encapsulated filter cartridge according to the subject disclosure, with a filter assembly including a carbon block filter element and a pleated filter element, wherein the direction of fluid flow through the encapsulated filter cartridge is illustrated by arrows.

FIG. 9 shows a disposable encapsulated filter cartridge constructed in accordance with another alternative embodiment of the subject disclosure and designated generally by reference numeral 610. As illustrated in FIG. 9, the filter cartridge 610 includes a sump 612 having an interior chamber 620 configured for supporting a filter assembly 622 and a closure cap 614 at the bottom end thereof for permanently enclosing the filter assembly 622 within the sump 612. The closure cap 614 is preferably spun welded to the bottom end of the sump 612. Other ways in which the closure cap 614 may be joined to the bottom end of the sump 612 may include ultrasonic welding, hot plate welding, induction welding and overmolding.

With continuing reference to FIG. 9, the sump 612 includes an elongated top portion 696 having an annular flange 696b and axial passage 696a extending therethrough and having an inlet 616 for the ingress of filtrate into the interior chamber 620 of the sump 612. According to this exemplary embodiment, the closure cap 614 includes an elongated portion 698, having an annular flange 698b and an axial passage 698a extending therethrough. An outlet 618 for the egress of filtered media from the interior chamber 620 may be located at the bottom end of the elongated portion 698 of the closure cap 614. The inlet 616 and the outlet 618 are generally aligned with the central axis of the sump 612. The inlet 616 is in communication with the radially outer surface of the filter assembly 622, while the outlet 618 is in communication with the axial cavity 626 of the carbon block element 624. The inlet and outlet 616 and 618 are preferably adapted and configured for mating with an appropriate port or module of an appliance, such as a water filtration appliance.

Similarly to previously described embodiments, the filter assembly 622 of the encapsulated filter cartridge 610 includes a microporous filter element, which in this embodiment is a generally cylindrical pleated filter element 670, disposed around the outer circumference of a carbon block element 624. Both the carbon block filter element 624 and the pleated filter element 670 of this exemplary embodiment are substantially as described in detail above in reference to other embodiments of the subject disclosure. In addition, the filter assembly 622 may include any number and/or combination of elements described above in reference to other exemplary embodiments.

With continuing reference to FIG. 9, an upper end cap 642 is operatively associated with the upper end of the filter assembly 622. Preferably, the upper end cap 642 is configured to receive and sealingly enclose the upper end of the carbon block element 624 and the upper end of the pleated filter element 670, so as to prevent filtrate from entering through the top surface of the filter assembly.

In the appropriate embodiments of the subject disclosure, a lower end cap 640 is operatively associated with the bottom end of the filter assembly 622. The lower end cap 640 has an axial passage 640*a* therethrough and a generally cylindrical portion 640*a* and preferably is configured to be secured to the closure cap 614. The lower end cap 640 preferably is configured to receive the lower end of the carbon block element 624 and the lower end of the pleated element 670 and sealingly secured to the closure cap 614 to prevent the unfiltered medium from entering the stream of filtered medium passing through the axial passage 640*a* to the outlet 618. The ways of sealingly securing the cylindrical portion 640*a* to the closure cap 614 may include the use of an O-ring, welding and other structures and methods known to those of ordinary skill in the art.

Optionally, the sump 612 may include a vent 720 for venting air from the interior chamber 620 of the sump 612 upon the start-up of the filtering process. The vent 720 includes a vent cap 714 for selective opening of the vent 720 and a sealing ring 712 for sealing engagement of the vent cap 714. If will be understood by those of ordinary skill in the art that any structure may be used in place of the vent 720 that will perform a similar function.

Further, the sump 612 may optionally include a drain 710 for draining the interior chamber 620 of the sump 612 of the remaining filtrate prior to disposal of the filter cartridge. The drain 710 includes a drain cap 714 for selective opening of the drain 710 and a sealing ring 712 for sealing engagement of the drain cap 714. It will be understood by those of ordinary skill in the art that any structure may be used in place of the drain 710 that will perform a similar function.

Referring further to FIG. 9, which has a set of arrows indicating the direction of the filtrate flow through the encapsulated filter cartridge 610, in operation, unfiltered medium enters through the axial passage 696*a* into the upper region 620*a* of the interior chamber 620 of the sump 612. The unfiltered medium then enters the radially outer surface of the filter assembly 622 and propagates radially inwardly into the axial cavity 626 of the carbon block filter element 624. After travelling along the axial cavity 626 of the carbon block element 624 in the downward direction, through the axial passage 640*a* of the end cap 640, and then through the axial passage 698*a,* the filtered medium exits the interior chamber 620 of the filter cartridge 610 through the outlet 618.

The encapsulated filter cartridges 510,610 constructed in accordance with the subject disclosure as described above also have various advantages over the prior art. Among those advantages are the increased ease of manufacturing and superior performance characteristics due to the permanent encapsulation of the filter assembly 522,622 within the sump 512,612 by the closure cap 514,614. The filter cartridge 510,610 need not be opened in order to replace the filter assembly 522,622 but is removed and discarded as a unit. This feature helps avoid contamination of the surrounding areas by stray particles from the filter assembly 522,622 promotes air- or fluid-tight operation of the filter cartridge 510,610 and facilitates contamination-free operation of the filter assembly 522,622.

In addition, among the advantages of the filter assembly 522,622 having a pleated element 570,670 disposed upstream of the carbon block filter 524,624 element is its capability of retaining microorganisms before they can enter the carbon block element 524,624 where they can grow, multiply and eventually colonize the filter cartridge. In addition, because in this embodiment the carbon block element 524,624 is located downstream of the pleated element 570,670 any undesirable odor or taste generated in the pleated element 570,670, e.g., due to the presence of microorganisms, may be subsequently removed by the carbon block element 524,674.

Although the encapsulated filter cartridge assemblies constructed in accordance with the subject disclosure have been described with respect to specific embodiments, those skilled in the art will readily appreciate that changes and modifications may be made thereto without departing from the spirit and scope of the present invention. For example, the encapsulated filter cartridges constructed in accordance with the subject disclosure may be used for pressurized as well as for gravity-fed applications.

What is claimed is:

1. An encapsulated filter cartridge for filtering fluids, comprising:
 a filter assembly having an upper end, a lower end, an axial portion and a radially outer surface and including:
   a carbon block filter element; and
   a gradient porosity microporous filter element surrounding the carbon block filter element, the microporous filter element being operably positioned upstream of the carbon block filter element and being effective to substantially retain microorganisms before the microorganisms can enter the carbon block element such that the microorganisms are substantially prevented from growing, multiplying and eventually colonizing the filter cartridge, the gradient porosity microporous filter element comprising:
     a membrane structure having a thickness of between about 130 and about 300 microns and a plurality of adjacent discrete zones, wherein any downstream zone has an average pore size from about 0.05 micron to about 0.8 micron;
 a permanently sealed sump defining an interior chamber configured to accommodate the filter assembly, the sump having an inlet for permitting unfiltered fluid to enter the interior chamber for communicating with the radially outer surface of the filter assembly, and an outlet for permitting filtered fluid to exit the interior chamber from the axial portion of the filter assembly; and structure for selectively connecting the encapsulated filter cartridge to a fluid source and selectively disconnecting the encapsulated filter cartridge from the fluid source.

2. The encapsulated filter cartridge of claim 1, wherein the filter assembly further comprises:
an upper end cap operatively associated with the upper end of the filter assembly.

3. The encapsulated filter cartridge of claim 2, wherein said upper end cap has a neck portion and an axial fluid passage extending therethrough for fluid communication between the axial portion of the filter assembly and the outlet of the sump.

4. The encapsulated filter cartridge of claim 3, further comprising:
a scaling ring disposed around the neck portion of the upper end cap.

5. The encapsulated filter cartridge of claim 4, further comprising:
a reception collar surrounding the outlet of the sump for sealing engagement of the neck portion of the upper end cap.

6. The encapsulated filter cartridge of claim 2, wherein said upper end cap is configured to receive and sealingly enclose the upper end of the filter assembly.

7. The encapsulated filter cartridge of claim 1, wherein the filter assembly further comprises:
a lower end cap operatively associated with the lower end of the filter assembly.

8. The encapsulated filter cartridge of claim 7, wherein the lower end cap is adapted for supporting the filter assembly within the interior chamber of the sump.

9. The encapsulated filter cartridge of claim 8, wherein the lower end cap comprises a plurality of fingers for engaging a wall of the interior chamber of the sump.

10. The encapsulated filter cartridge of claim 7, wherein the lower end cap includes an axial passage extending therethrough for communication between the axial portion of the filter assembly and the outlet of the sump.

11. The encapsulated filter cartridge of claim 1, wherein the sump includes a closure cap permanently sealing the sump at one end.

12. The encapsulated filter cartridge of claim 11, wherein the closure cap is joined to the end of the sump by spun welding, ultrasonic welding, hot plate welding, induction welding or overmolding.

13. The encapsulated filter cartridge of claim 11, wherein the closure cap has an axial passage therethrough for communication between the axial portion of the filter assembly and the outlet of the sump.

14. The encapsulated filter cartridge of claim 1, further comprising an inlet tube operatively associated with the inlet of the sump and an outlet tube operatively associated with the outlet of the sump, said inlet and outlet tubes both configured as fittings for mating with an appliance.

15. The encapsulated filter cartridge of claim 1, further comprising:
means for venting air from the interior chamber of the sump.

16. The encapsulated filter cartridge of claim 1, further comprising:
means for draining filtrate from the interior chamber of the sump.

17. The encapsulated filter cartridge of claim 1, wherein the downstream adjacent membrane structure discrete zones have a smaller average pore size than at least one upstream discrete zone.

18. The encapsulated filter cartridge of claim 17, wherein the downstream discrete zones have an average pore size rated at about 0.2 micron and the upstream discrete zones have an average pore size rated at about 0.65 micron.

19. The encapsulated filter cartridge of claim 17, wherein at least one downstream discrete zone has a smaller average pore size than at least one upstream discrete zone.

20. An encapsulated filter cartridge for filtering fluids, comprising:
a filter assembly having an upper end, a lower end, an axial portion and a radially outer surface and including:
a carbon block filter element; and
a gradient porosity microporous filter element surrounding the carbon block filter element, the microporous filter element being operably positioned upstream of the carbon block filter element and being effective to substantially reduce virus and bacteria by about 2 log to about 6 log size range before the virus and bacteria can enter the carbon block element such that the virus and bacteria are substantially prevented from growing, multiplying and eventually colonizing the filter cartridge, the gradient porosity microporous filter element comprising:
a membrane structure having a thickness of between about 130 and about 300 microns and a plurality of adjacent discrete zones; and
a permanently sealed sump defining an interior chamber configured to accommodate the filter assembly, the sump having an inlet for permitting unfiltered fluid to enter the interior chamber for communicating with the radially outer surface of the filter assembly, and an outlet for permitting filtered fluid to exit the interior chamber from the axial portion of the filter assembly.

* * * * *

UNITED STATES PATENT AND TRADEMARK OFFICE
CERTIFICATE OF CORRECTION

| | |
|---|---|
| PATENT NO. | : 7,081,201 B2 |
| APPLICATION NO. | : 10/418386 |
| DATED | : July 25, 2006 |
| INVENTOR(S) | : Laurence W. Bassett |

It is certified that error appears in the above-identified patent and that said Letters Patent is hereby corrected as shown below:

Column 19,
Line 15, delete "scaling" and insert --sealing--.

Signed and Sealed this

Third Day of October, 2006

JON W. DUDAS
*Director of the United States Patent and Trademark Office*